United States Patent [19]

Metzger

[11] 3,956,933
[45] May 18, 1976

[54] VARIABLE AREA FLOWMETER
[75] Inventor: Harold W. Metzger, Willow Grove, Pa.
[73] Assignee: Fischer & Porter Co., Warminster, Pa.
[22] Filed: July 23, 1974
[21] Appl. No.: 491,467

[52] U.S. Cl. .................................................. 73/209
[51] Int. Cl.² ............................................. G01F 1/22
[58] Field of Search...................... 73/209, 210, 207

[56] References Cited
UNITED STATES PATENTS
3,342,068  9/1967  Metzger ................................. 73/209
3,712,134  1/1973  Dettmer ................................. 73/209
3,768,309  10/1973  Hart ...................................... 73/209
3,842,671  10/1974  Frizelle ................................. 73/209

Primary Examiner—Richard C. Queisser
Assistant Examiner—Daniel M. Yasich

[57] ABSTRACT

A flowmeter of the rotameter type wherein a thin-walled variable-area glass tube containing a float is encapsulated in a transparent plastic bar having upper and lower lateral bores therein. The bores communicate with the inlet and outlet ends of the tube and are adapted to receive retainer elements for attaching the bar to a meter frame and for coupling the flow passage to inlet and outlet pipe couplers.

3 Claims, 6 Drawing Figures

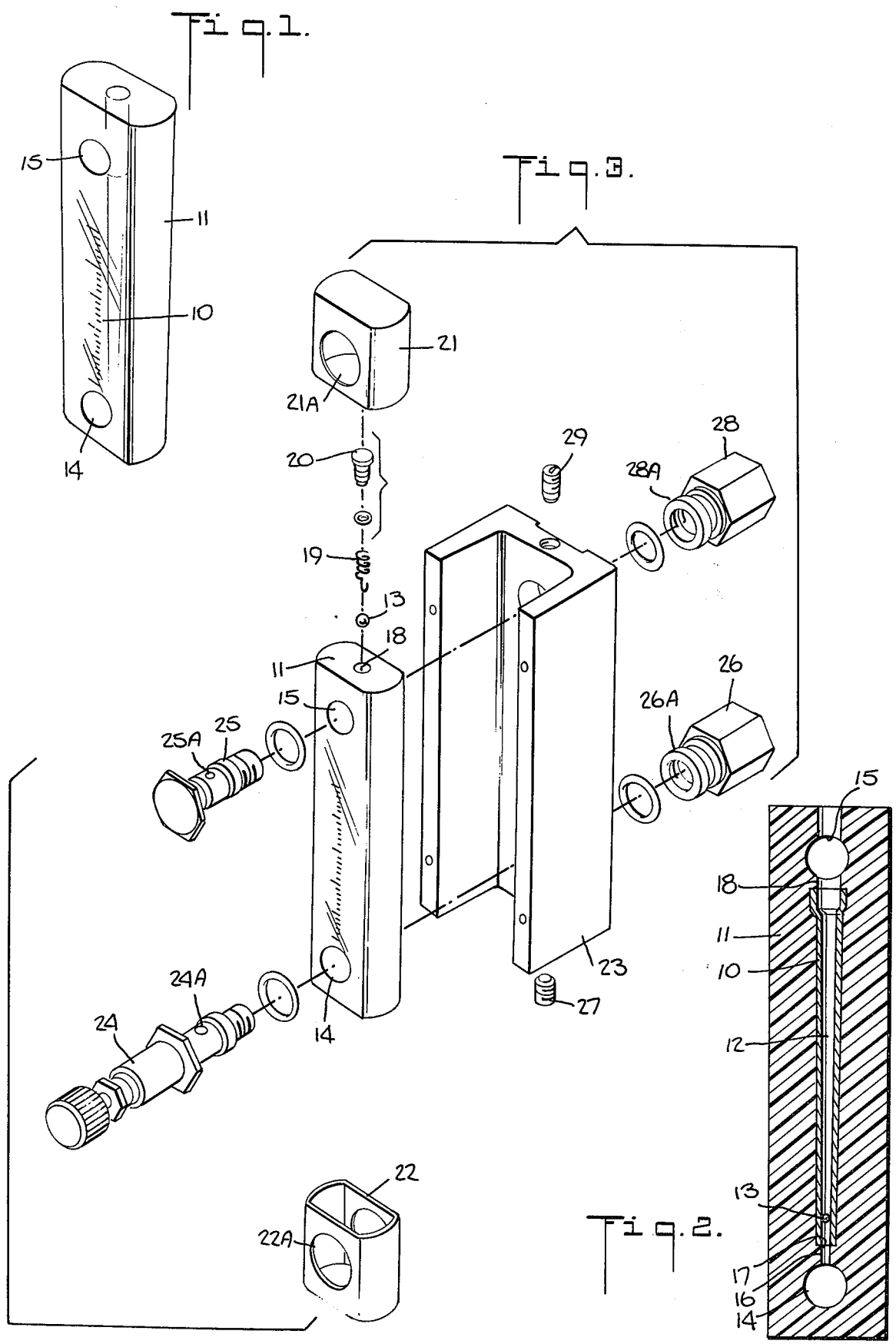

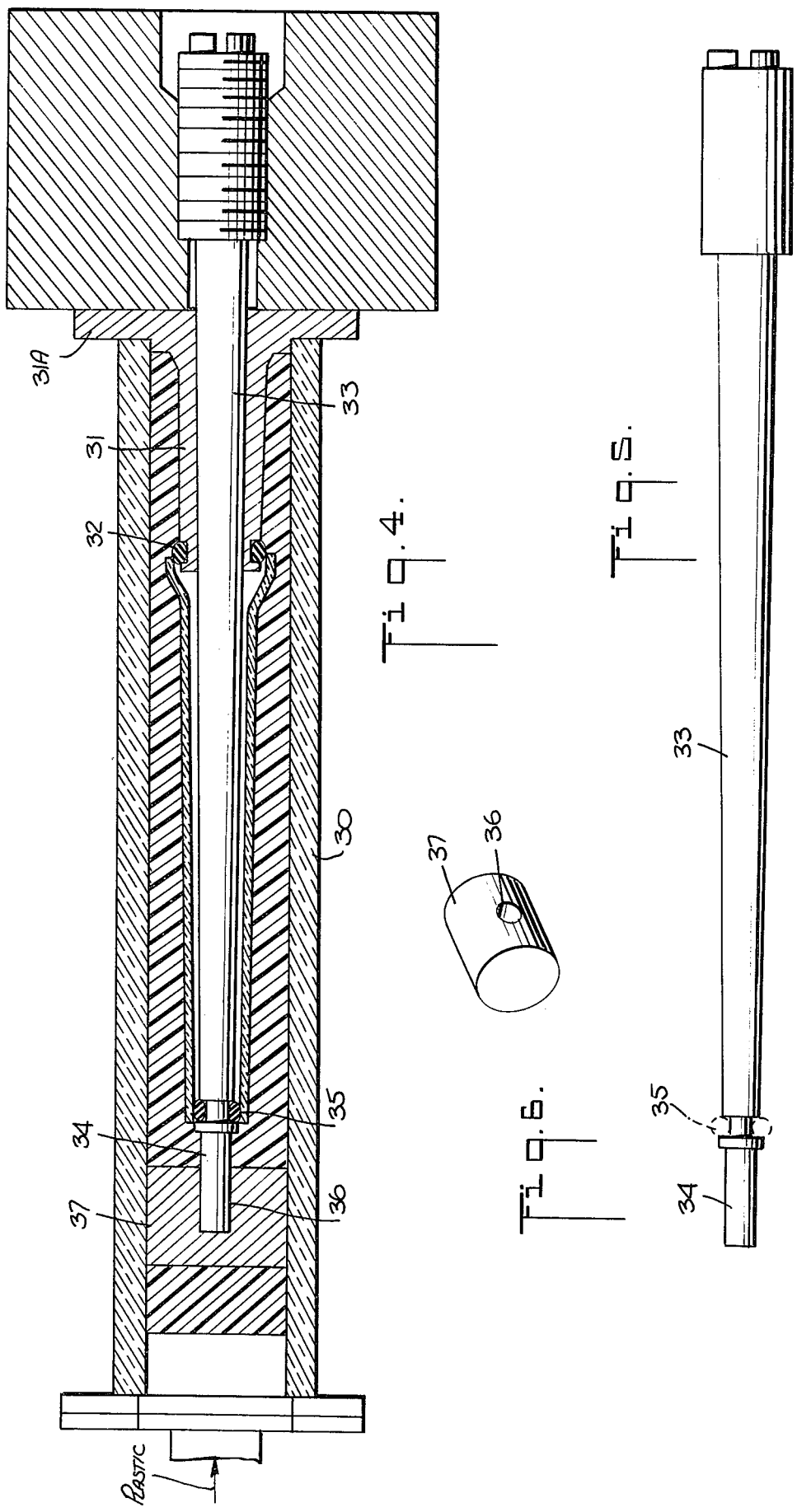

VARIABLE AREA FLOWMETER

BACKGROUND OF THE INVENTION

This invention relates generally to a flowmeter of the rotameter type having a variable-area tube, and more particularly to a rotameter in which the meter tube is protectively encapsulated in a plastic bar.

In the usual type of rotameter, a weighted plummet or float contained in an upright tapered tube is raised to a position of equilibrium between the downward force of the float and the upward force of the fluid flowing past the float through the annular orifice surrounding the float. The term "rotameter" was derived from the fact that plummets originally had slots to impart a rotational force thereto for the purpose of centering and stabilizing the float. The present trend, however, is toward non-rotating floats.

In one well-known commercial form of rotameter, such as that disclosed in U.S. Pat. No. 3,342,068, in lieu of a tapered tube, the flowmeter is provided with a tube having a tapered bore affording a variable cross-sectional area. The float disposed in the bore assumes a vertical position depending on the rate of fluid flow, which may be of liquid or gas. The vertical position of the float is indicated along a calibrated scale on the front of the tube.

Because the meter tube is made of thin-walled glass and is relatively fragile, in existing types of variable-area flowmeters, the tube is supported by end fittings mounted within a case adapted to protect the tube against stresses as well as to effect tight sealing thereof. In the typical arrangement, the end fittings for the tube are attached to the case at opposing positions therein, and inlet and outlet adapters are provided to facilitate insertion of the tube in the end fittings.

As operating pressure is increased in the flowmeter tube, the ends of the glass tube are subjected to a substantial pressure from the end fittings. Since the end fittings are confined within the case, the pressure on the end fittings is applied to the case and because of the pressure developed at the ends of the tube, there is a tendency for the case to warp. As the case distorts, it transmits a bending moment to the tube.

On a long, slender tube, the resultant cross-bending gives rise to a distinctly visible bow. In a shorter tube, the amount of bowing is less evident to the naked eye, but it is reflected in lowered strength values for the tube. It has been found that the bowing phenomenon experienced in conventional flowmeter tube arrangements will in some instances result in breakage of the tube. Thus the very meter case intended to protect the tube is responsible for damage thereto. Moreover, existing case or frame arrangements for variable-area flowmeters add materially to the cost of the meter.

The pressure rating of a variable-area metering tube depends on the tensile strength characteristics of the glass used to form the tube, as well as on its wall thickness. However, the maximum pressure rating of a given meter affords no assurance that breakage will not occur at lower pressures.

An exposed glass tube of good inherent strength may be weakened by scratches on the surface thereof, and should the tube shatter in the course of the operation, serious injuries may be inflicted on personnel in the vicinity thereof. Also the manner of installation may be defective, and give rise to stresses resulting in tube fracture. While it has sometimes been the practice to provide safety enclosures for the variable-area glass tube meters, this adds materially to the cost of installation and also interferes to some extent with the readability of the meter.

In order to overcome the drawbacks encountered with thin-walled variable-area glass flowmeter tubes and to avoid the need for end fittings to support the tube, it is known to make use of a relatively thick molded glass block which is drilled, polished and otherwise processed to define a longitudinally-extending internal passage which is tapered to provide suitable variable area characteristics. The ends of the passage communicate with lateral bores adapted to receive retainer elements which serve to attach the block to a meter frame and to couple the upper and lower ends of the passage to inlet and outlet pipe couplers.

One such glass meter bar arrangement is disclosed in Instruction Bulletin 10 A 1350, published February, 1974 by Fischer & Porter Co. of Warminster, Pa. The difficulty with this arrangement is that the fabricating costs of the glass block are high, and while a glass block is stronger than the conventional thin-walled tube, it still has the inherent limitations of glass and is subject to breakage. As indicated in the Bulletin, the strains transmitted to the glass when tightening process pipes or when replacing the retainers may result in damage thereto.

An alternative approach to overcoming the limitations of a thin-walled glass meter tube is that disclosed in U.S. Pat. No. 3,768,309 wherein the tube and end fittings therefor are encapsulated in a clear plastic jacket. The problem with such an arrangement is that it is very difficult, as a practical matter, to encapsulate both the tube and the end fittings. Moreover the plastic tube and end fittings assembly is limited to meter structures adapted to cooperate with the particular fittings integrated with the glass tube.

SUMMARY OF THE INVENTION

In view of the foregoing, it is the main object of this invention to provide a variable-area, thin-walled meter tube protectively encapsulated in a clear plastic bar having lateral openings therein to facilitate mounting of the bar in a meter frame.

Also an object of the invention is to provide an encapsulated flowmeter tube wherein the protective plastic bar resists the application of bending forces to the tube and thereby serves to prevent damage to the meter.

Still another object of the invention is to provide a bar-encapsulated meter tube which may be readily fabricated at low cost.

Yet another object of the invention is to provide an improved molding technique for encapsulating a variable-area glass meter tube within a plastic bar.

Briefly stated, these objects are attained in a thin-walled, variable-area tube formed of glass and containing a float, the tube being encapsulated in a transparent plastic bar having upper and lower lateral bores therein which communicate through ducts with the inlet and outlet ends of the tube and are adapted to receive retainer elements for attaching the bar to a meter frame and for coupling the tube ends to inlet and outlet pipe couplers.

OUTLINE OF THE DRAWING

For a better understanding of the invention as well as other objects and further features thereof, reference is made to the following detailed description to be read in conjunction with the accompanying drawing, wherein:

FIG. 1 is a perspective view of a flowmeter tube encapsulated in a plastic bar in accordance with the invention;

FIG. 2 is a longitudinal section taken through the bar;

FIG. 3 is an exploded view showing the bar and the supporting frame and retainer elements associated therewith;

FIG. 4 is a section taken through a mold for making the bar;

FIG. 5 is a separate showing of the mandrel used in conjunction with the mold; and FIG. 6 illustrates a plug used in conjunction with the mold.

DESCRIPTION OF THE INVENTION

Referring now to FIGS. 1 and 2 of the drawing, there is shown an encapsulated meter tube 10 in accordance with the invention, the tube being embedded within a transparent plastic bar 11 having flat front and rear faces and a generally rectangular cross-section. The sides of the bar are slightly curved and the length of the bar is greater than that of the tube embedded therein to provide end portions extending beyond the lower and upper ends of the tube.

Meter tube 10 which is open-ended, is preferably fabricated of thin-walled borosilicate glass, the tube having a precision-molded tapered bore 12 extending longitudinally therethrough. The tube bore defines a variable area passage to accommodate a float 13.

Bar 11 is molded of plastic material having acceptable mechanical, optical and chemical properties. Acrylics such as Lucite and Plexiglas are advantageous for this purpose, not only by reason of their crystal clarity and excellent light-permeability characteristics, but also because of their high impact strength and high resistance to most chemicals. Also suitable as a bar material are polyesters.

Formed in the end portions of the plastic bar are large-diameter lateral bores 14 and 15 which are adapted to receive retainer elements. Bore 14 communicates with the inlet end of meter tube 10 through a short connecting duct 16 formed in the bar. Duct 16 lies in axial alignment with the tube passage, but has a smaller diameter than the tube inlet to define a shoulder 17 acting as an inlet stop for the float. A longer duct 18 runs between the outlet end of meter tube 10 and the upper end of the bar. Duct 18 lies in axial alignment with and has about the same diameter as the outlet end of the tube passage, the duct intersecting the lateral bore 15.

Float 13 preferably consists of a spherical ball of stainless steel or other non-corrodible material. Under fluid pressure the float is raised in the bore of tube 10 from the inlet stop formed by shoulder 17 to a level depending on flow rate, the upper limit of float movement being fixed by an outlet stop. As shown in FIG. 3, the outlet stop is in the form of a helical spring 19 that is received in duct 18. The duct 18 is sealed by a metal end plug 20. Fitting over the upper end portion of the plastic bar 11 is a cap 21 having lateral openings 21A in registration with lateral bore 15. Fitted over the lower end portion of plastic bar 11 is a cap 22 having lateral opening 22A in registration with lateral bore 14.

The bar-encapsulated meter tube 10 is held within a protective channel-shaped frame 23 and is attached thereto by retainer elements 24 and 25. Retainer element 24 may be in the form of a control valve having an externally-threaded tubular extension which passes through lateral bore 14 in the lower end of the plastic bar and is threadably received by an inlet pipe coupler 26 serving to couple the meter to a process line. The annular mouth 26A of inlet coupler 26 is socketed within a hole formed in the wall of frame 23 and is locked thereto by means of a set screw 27.

The upper retainer 25 is similarly attached to an outlet pipe coupler 28 whose annular mouth 28A is socketed within a hole formed in the wall of frame 23 and is locked thereto by means of set screw 29. The retainer elements 24 and 25 are provided with lateral openings 24A and 25A, respectively, which couple the inlets and outlets of the meter tube to the inlet and outlet pipe couplers. Suitable O-ring seals are provided to prevent fluid leakage.

The thin-walled variable-area glass tube 10 is fabricated by conventional methods and its internal bore and external surfaces may be in any desired formation. FIG. 4 illustrates the mold for forming the plastic bar and for embedding the tube 10 therein. The mold 30, which is preferably of glass, is open-ended and has a form corresponding to the desired configuration of the bar.

The outlet end of meter tube 10 is supported in the mold by means of a tubular holder 31 whose inner end engages the outlet end of meter tube 10, a seal therebetween being effected by an O-ring 32. The outer end of the holder is provided with a flange 31A which rests against one end of mold 30. Passing through holder 31 is a long mandrel 33, shown separately in FIG. 5. The shank of the mandrel extends through the longitudinal bore of meter tube 10 and is provided with a tip 34 which projects beyond the inlet end of the meter tube. A circular groove is formed at the junction of tip 34 and the shank of mandrel 32 to accommodate an O-ring 35 which seals the inlet end of the meter tube. Thus O-rings 32 and 35 serve to prevent leakage of plastic into the bore of the meter tube.

The nose of tip 33 of the mandrel is received in a recess 36 formed in a cylindrical plug 37 seated within the mold. This plug defines the lateral bore 14 in the plastic bar. The exposed portion of the tip acts to define the connecting duct 16 in the molded bar. Thus the meter tube is supported in the mold between holder 31 and plug 37.

In molding, the plastic solution is fed into the mold through an input port to fill the space therein between the interior walls of the mold and the outer surface of the meter tube. The filled space between the mold and the tube holder 31 defines the upper end portion of the plastic bar, the holder creating the duct 18 in the bar. The other lateral bore 15 is drilled in this end portion of the bar after it has been molded.

In carrying out the molding process, the clear plastic encapsulating resin is first mixed with an appropriate catalyst, being careful not to entrap air. The solution is then fed into the inlet port of the mold to fill the spaces therein and the plastic is allowed to cure at room temperature. Curing may be accelerated by the application of heat to the mold. After curing is completed and the plastic is fully solidified, the glass mold and the mounting supports for the meter tube are withdrawn.

While there has been shown and described preferred embodiments in accordance with the invention, it will be appreciated that many changes and modifications may be made therein without, however, departing from the essential spirit thereof.

I claim:

1. A rotameter comprising:
  A. a transparent plastic bar having flat front and rear faces and a generally rectangular cross-section encapsulating a thin-walled variable-area borosilicate glass tube having a precision molded longitudinally-extending variable-area passage therein containing a float, said bar having a lateral bore at the lower end portion thereof communicating through a duct with the inlet of the tube and having a lateral bore at the upper end portion thereof communicating through a duct with the outlet of the tube,
  B. a channel-shaped frame member adapted to receive said bar and having a wall which abuts the rear face of said bar, the front face of the bar being exposed and having indicia inscribed thereon, said wall having holes therein in registration with said lateral bores, and
  C. hollow retaining elements extending through said bores into said holes to engage inlet and outlet pipe couplers socketed in the holes in said wall, said retainer elements having openings therein communicating with said ducts whereby fluid admitted into said inlet coupler passes through said tube passage into said outlet coupler, one of said retainer elements being a control valve.

2. A rotameter as set forth in claim 1, wherein said bar is molded of polyester material.

3. A rotameter as set forth in claim 1, wherein said bar is molded of acrylic material.

* * * * *